United States Patent
Zhao et al.

(10) Patent No.: US 10,684,421 B2
(45) Date of Patent: Jun. 16, 2020

(54) GRAVITY ADAPTED FIBER CONNECTER

(71) Applicant: Accelink Technologies Co., Ltd., Wuhan, Hubei (CN)

(72) Inventors: Xiaobo Zhao, Wuhan (CN); Xinhai Zhu, Wuhan (CN); Zhechi Lu, Wuhan (CN); Wenchuang Gao, Wuhan (CN); Yi Jiang, Wuhan (CN); Benqing Quan, Wuhan (CN); Yuxiang Yang, Wuhan (CN)

(73) Assignee: Accelink Technologies Co., Ltd. (CN)

( * ) Notice: Subject to any disclaimer, the term of this patent is extended or adjusted under 35 U.S.C. 154(b) by 0 days.

(21) Appl. No.: 16/345,807

(22) PCT Filed: Dec. 19, 2016

(86) PCT No.: PCT/CN2016/110663
§ 371 (c)(1),
(2) Date: Jul. 24, 2019

(87) PCT Pub. No.: WO2018/076500
PCT Pub. Date: May 3, 2018

(65) Prior Publication Data
US 2019/0361175 A1    Nov. 28, 2019

(30) Foreign Application Priority Data

Oct. 27, 2016    (CN) .......................... 2016 1 0958666

(51) Int. Cl.
*G02B 6/38*        (2006.01)
(52) U.S. Cl.
CPC ........... *G02B 6/3821* (2013.01); *G02B 6/387* (2013.01); *G02B 6/3846* (2013.01); *G02B 6/3887* (2013.01)

(58) Field of Classification Search
CPC .... G02B 6/3821; G02B 6/3846; G02B 6/387; G02B 6/3887
(Continued)

(56) References Cited

U.S. PATENT DOCUMENTS

| 4,779,949 A | 10/1988 | Iri et al. |
| 2007/0104445 A1* | 5/2007 | Larson ................. G02B 6/3846 |
| | | 385/134 |

FOREIGN PATENT DOCUMENTS

| CN | 1039307 A | 1/1990 |
| CN | 1920604 A | 2/2007 |

(Continued)

OTHER PUBLICATIONS

International Search Report PCT/CN2016/110663, dated Jul. 27, 2017.

*Primary Examiner* — Jerry M Blevins
(74) *Attorney, Agent, or Firm* — Lerner, David, Littenberg, Krumholz & Mentlik, LLP

(57) ABSTRACT

Disclosed is a gravity-adapted optical-fiber-connector comprising a gravity-adapted block and at least one gravity connector each including a fiber-stub; tail handle; rear seat being clamped and fixed by gravity-adapted block; elastic device being sleeved on a portion of excircle surface of tail handle and limited by an end face of rear seat and that of tail handle; outer sleeve and optical cable; gravity of gravity-adapted block is applied to elastic device through the end face of rear seat, after the elastic device is compressed, a spring having identical magnitude and direction with the gravity is generated and acted on the end face of tail handle, such that a physical butt-joint-surface of fiber-stub is always applied a preload about the gravity. The gravity-adapted optical-fiber-connector has stable optical-fiber coupling efficiency and coupling performance.

8 Claims, 3 Drawing Sheets

(58) Field of Classification Search
USPC .......................................................... 385/56
See application file for complete search history.

(56) References Cited

FOREIGN PATENT DOCUMENTS

| | | |
|---|---|---|
| CN | 2890960 Y | 4/2007 |
| CN | 201242602 Y | 5/2009 |
| CN | 202522735 U | 11/2012 |
| CN | 105445867 A | 3/2016 |
| CN | 205301631 U | 6/2016 |
| DE | 4123227 C1 | 7/1992 |
| JP | 2008102290 A | 5/2008 |
| JP | 4267620 B2 | 5/2009 |

* cited by examiner

GRAVITY ADAPTED FIBER CONNECTER

CROSS-REFERENCE TO RELATED APPLICATIONS

The present application is a national phase entry under 35 U.S.C. § 371 of International Application No. PCT/CN2016/110663 filed Dec. 19, 2016, published in Chinese, which claims priority from CN 201610958666.7 filed Oct. 27, 2016, all of which are incorporated herein by reference.

TECHNICAL FIELD

The present disclosure relates to an optical fiber connector, and particularly, to an optical fiber connector for realizing a precise pre-tightening force, and the present disclosure belongs to the fields of high voltage electric power control, laser transmission and communication.

BACKGROUND

An optical fiber connector is a device that is detachably connected between an optical fiber and an optical fiber, which precisely butt joints two end faces of the optical fibers so that the light energy output from the transmitting optical fiber can be furthest coupled to the receiving optical fiber, and may make the impact on a system caused by its intervention in optical link be minimized.

In the butt joint process of an existing optical fiber connector, a fiber stub of the connector is retracted basically through buckling a mechanical clip key structure on a mechanical reference surface with a specific structure on an adapter, and at the same time, an elastic device of the connector is squeezed, and the elastic device generates a reaction force that is positively correlated with a distance retracted by the fiber stub to provide a pre-tightening force for butt joint of two fiber optical fiber end faces. However, errors of mechanical parts and assemblies lead to different distances retracted by the fiber stubs and different pre-tightening forces received by physical butt joint surfaces of the fiber stub when each connector is butt jointed. Under the background of requiring optical fiber connector butt joint technology to be increasingly precise, the coupling efficiency difference caused by fluctuations of pre-tightening force has become one of the technical problems of optical fiber butt joint that need to be urgently solved, especially in the field of optical energy transmission, such problem of pre-tightening force fluctuation cannot be tolerated.

SUMMARY

In order to solve the problems in the prior art, the present disclosure provides a gravity-adapted optical fiber connector, which has stable optical fiber coupling efficiency and coupling performance.

The technical solution of the present disclosure is as follows.

A gravity-adapted optical fiber connector comprising a gravity-adapted block and at least one gravity connector, each gravity connector including a fiber stub, a tail handle, an elastic device, a rear seat, an outer sleeve and an optical cable; wherein an optical fiber in the optical cable is coupled to the fiber stub through the tail handle and the outer sleeve; an end of the tail handle is fixedly connected with the fiber stub, and the other end is connected with the outer sleeve; the elastic device is sleeved on a portion of excircle surface of the tail handle and is limited by an end face of the rear seat and an end face of the tail handle, the rear seat is clamped and fixed by the gravity-adapted block, gravity of the gravity-adapted block is applied to the elastic device through the end face of the rear seat, and after compressed, the elastic device generates an elastic force having the same magnitude and direction as those of the gravity of the gravity-adapted block which acts on the end face of the tail handle, such that a physical butt joint surface of the fiber stub is always applied with a pre-tightening force related to the gravity of the gravity-adapted block.

The gravity adapter includes an installation groove and a clamping hole, wherein a width of the installation groove is larger than an outer diameter of the optical cable, the clamping hole is connected with the installation groove, and an inner diameter of the clamping hole is not larger than a diameter of excircle surface of the rear seat with which it is matched.

A material of the gravity-adapted block is an elastic material.

An optical axis of the gravity-adapted connector when used and matched is extended along a gravity direction or a consistent direction equivalent to the gravity direction, wherein a gravity distribution of the fiber stub, the tail handle, the elastic device, the rear seat, the outer sleeve, the optical cable, and the gravity-adapted block are symmetrical along circumference of the optical axis.

The optical cable includes an optical fiber, an optical cable aramid, and an optical cable sheath sequentially arranged from inside to outside, the optical cable aramid is provided between the tail handle and the outer sleeve, and the optical cable aramid, the outer sleeve and the tail handle are connected into a whole; the optical cable sheath and the outer sleeve are connected into a whole through a flexible glue or a rivet connection or a threaded connection.

The tail handle is a step structure including a first excircle surface and a second excircle surface, the rear seat includes an end face of the rear seat, a first inner hole of the rear seat, a second inner hole of the rear seat, and an excircle surface of rear seat; an aperture of the second inner hole of the rear seat is larger than an outer diameter of the outer sleeve, an aperture of the first inner hole of the rear seat is larger than a diameter of second excircle surface of the tail handle; a size of inner hole of the elastic device is larger than the diameter of the second excircle surface of the tail handle, but it is smaller than a diameter of first excircle surface of the tail handle and is smaller than an outer diameter of the rear seat.

A material of the gravity-adapted block is an iron-nickel alloy 4J29.

A number of the gravity connector is set to be more than one, and a plurality of the gravity connectors share one gravity-adapted block, the gravity-adapted block includes an installation groove and a clamping hole whose numbers are matched with that of the gravity connector, the rear seat of each gravity connector is provided in a corresponding clamping hole of the gravity-adapted block, such that the gravity connector is fixedly connected with the gravity-adapted block, each clamping hole is provided at a gravity center position of the gravity-adapted block where the corresponding gravity connector is located.

The beneficial effects of the present disclosure are as follows:

according to the above solution, when the optical fiber connectors are butt jointed, the gravity of the gravity-adapted block is transmitted to the end face of the connector through the elastic device, such that the end face of the optical fiber connector receives a pre-tightening force with stable magnitude and direction, and this pre-tightening force is not related to an extension length of the fiber stub, a length of the tail handle and an assembly error of the parts, and the magnitude of the pre-tightening force may be precisely controlled when the connector is butt jointed only by designing the gravity distribution of the gravity-adapted block around the circumference of the connector.

REFERENCE SIGNS

1 Adapter;
2 Fiber stub;
3 Tail handle;
4 Elastic device;
5 Rear seat;
6 Gravity-adapted block;
7 Outer sleeve;
8 Glue;
9 Optical cable;
1-1 Collimating sleeve of adapter;
1-2 Another optical receiving device of adapter;
2-1 Inner hole of fiber stub;
2-2 Physical butt joint surface;
2-3 Optical reference surface (ORS) of fiber stub;
3-1 One end of tail handle;
3-2 First end face of tail handle;
3-3 Second excircle surface of tail handle;
3-4 The other end of tail handle;
3-5 First excircle surface of tail handle;
5-1 End face of rear seat;
5-2 First inner hole of rear seat;
5-3 Second inner hole of rear seat;
5-4 Excircle surface of rear seat;
6-1 Installation groove of gravity-adapted block;
6-2 Clamping hole of gravity-adapted block;
7-1 End face of outer sleeve; 7-2—Inner hole of outer sleeve;
7-3 Excircle surface of outer sleeve;
7-4 Second inner hole of outer sleeve;
9-1 Optical cable aramid;
9-2 Optical cable sheath;
9-2-1 Excircle diameter of optical cable sheath;
9-3 Fiber stub of Optical cable

DESCRIPTION OF EMBODIMENTS

Hereinafter, a description will further explain how the present disclosure is realized with reference to drawings and embodiments.

Figure 1:
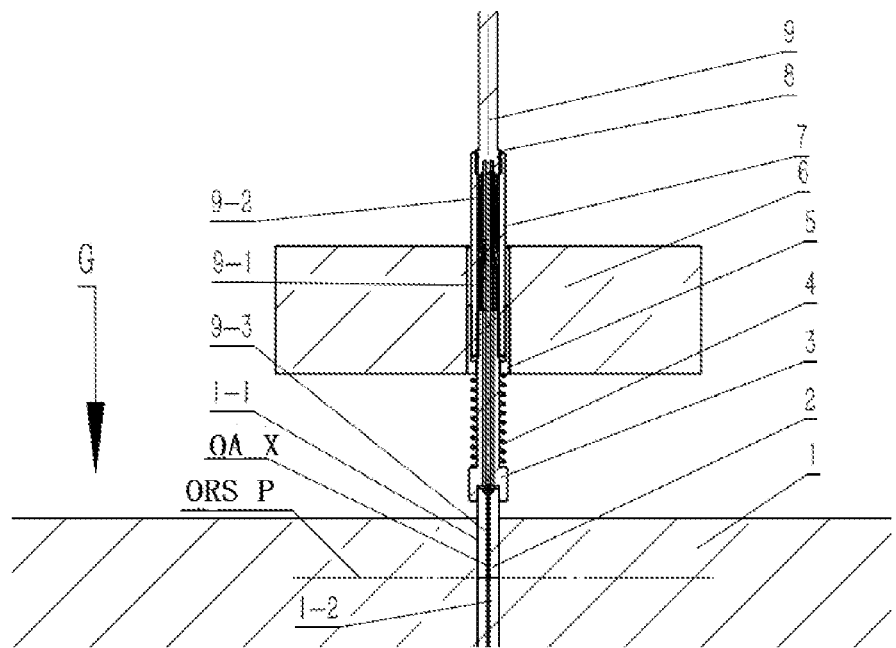
FIG. 1 is a schematic diagram of a gravity-adapted optical fiber connector according to the present disclosure.

As shown in FIG. 1, a gravity-adapted optical fiber connector comprises a gravity connector and a gravity-adapted block 6 coaxially mounted, wherein the gravity connector includes a fiber stub 2, a tail handle 3, an elastic device 4, a rear seat 5, an outer sleeve 7, and an optical cable 9; the fiber stub 2, the tail handle 3, the optical cable 9, and the outer sleeve 7 form a whole, a portion of which is provided in an inner hole of the rear seat 5, and the gravity adaptation block 6 has a certain weight and is fixedly connected to the rear seat 5. The fiber stub 2, the tail handle 3, the elastic device 4, the rear seat 5, the gravity-adapted block 6, the outer sleeve 7, the optical cable 9, and a flexible glue 8 connecting the outer sleeve 7 and the optical cable 9 are all symmetrical about the circumference an optical axis X (OA X).

Figure 2:
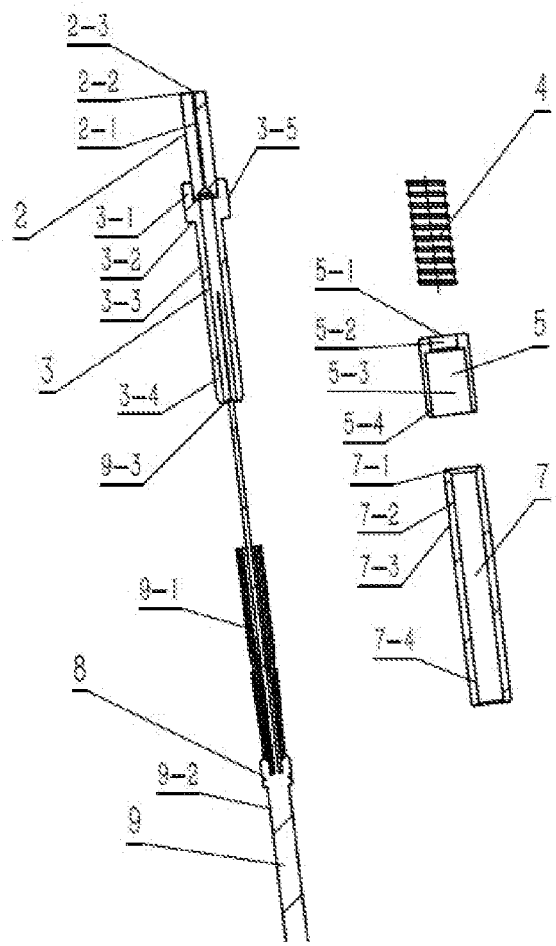
FIG. 2 is an exploded diagram of a gravity-adapted optical fiber connector (without a gravity-adapted block) according to the present disclosure.

As shown in FIG. 2, the fiber stub 2 includes an inner hole 2-1 of the fiber stub, and the inner hole 2-1 of the fiber stub is provided with an optical fiber in its center, and an optical reference surface 2-3 of the fiber stub is formed on a physical butt joint surface 2-2 at one end of the fiber stub 2; the tail handle 3 includes an end 3-1 of the tail handle, a first end face 3-2 of the tail handle, a second excircle surface 3-3 of the tail handle, the other end 3-4 of the tail handle, and a first excircle surface 3-5 of the tail handle; the rear seat 5 includes an end face 5-1 of the rear seat, a first inner hole 5-2 of the rear seat, a second inner hole 5-3 of the rear seat, and an excircle surface 5-4 of the rear seat; the outer sleeve 7 includes an end face 7-1 of the outer sleeve, an inner hole 7-2 of the outer sleeve, an excircle surface 7-3 of the outer sleeve, and a second inner hole 7-4 of the outer sleeve; the optical cable 9 is composed of an optical fiber 9-3, an optical cable aramid 9-1, and an optical cable sheath 9-2 successively from inside to outside.

As shown in FIGS. 1-2, the optical fiber 9-3 of the optical cable 9 is provided at the center of the inner hole 2-1 of the fiber stub 2; an end 3-1 of the tail handle is coaxially and fixedly connected with the fiber stub 2, and the other end 3-4 of the tail handle is connected with the outer sleeve 7; the cable aramid 9-1 is provided in an interlayer between an outer circumferential surface of the other end 3-4 of the tail handle 3 and the inner hole 7-2 of the outer sleeve 7, in an embodiment of the present disclosure, an outer thread is provided on the outer circumferential surface of the other end 3-4 of the tail handle 3, and an inner thread is provided on the inner circumferential surface of the inner hole 7-2 of the outer sleeve 7; the optical cable aramid 9-1 is disposed between the outer thread of the other end 3-4 of the tail handle and the inner thread of the inner hole 7-2 of the outer sleeve, and after the inner and outer threads are engaged with each other, the optical cable aramid 9-1 is tightly fixed between the other end 3-4 of the tail handle and the inner hole 7-2 of the outer sleeve; the optical cable sheath 9-2 and the second inner hole 7-4 of the outer sleeve 7 are connected into a whole through the flexible glue 8; thus, the optical cable aramid 9-1, the outer sleeve 7, and the tail handle 3 are connected into a whole.

An aperture of the first inner hole 5-2 of the rear seat 5 is larger than a diameter of the excircle surface 7-3 of the outer sleeve and a diameter of the second excircle surface 3-3 of the tail handle 3; a gap is provided between the first inner hole 5-2 of the rear seat 5 and the second excircle surface 3-3 of the tail handle, and a gap is provided between the second inner hole 5-3 of the rear seat and the excircle surface 7-3 of the outer sleeve 7. A size of the inner hole of the elastic device 4 is larger than a diameter of the second excircle surface 3-3 of the tail handle, but it is smaller than a diameter of the first excircle surface 3-5 of the tail handle and an outer diameter of the excircle surface 5-4 of the rear seat 5, and the elastic device 4 is sleeved on the second excircle surface 3-3 of the tail handle and is provided between the end face 5-1 of the rear seat and the first end face 3-2 of the tail handle.

Figure 3:
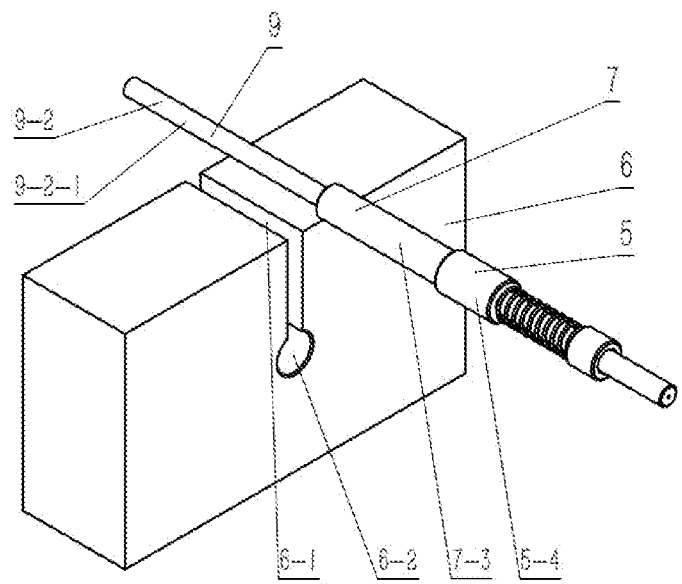
FIG. 3 is an exploded diagram of a gravity-adapted optical fiber connector (with a gravity-adapted block) according to the present disclosure.

As shown in FIG. 2 and FIG. 3, the gravity-adapted block 6 of the gravity-adapted optical fiber connector includes an installation groove 6-1 and a clamping hole 6-2. In an embodiment of the present disclosure, a width of the installation groove 6-1 is larger than an outer diameter 9-2-1 of the sheath 9-2 of the optical cable 9 but is smaller than an inner diameter of the clamping hole 6-2; the inner diameter of the clamping hole 6-2 is larger than the diameter of the excircle surface 7-3 of the outer sleeve 7, and is not larger than the diameter of the excircle surface 5-4 of the rear seat 5; the gravity-adapted block 6 uses a material of iron-nickel alloy 4J29 with good deformation recovery capability. During installation, the optical cable 9 is firstly brought into the clamping hole 6-2 through the installation groove 6-1, and the optical cable 9 and an assembly composed of the fiber stub 2, the tail handle 3, the elastic device 4, the rear seat 5, and the outer sleeve 7 are moved along the optical axis X, such that the excircle surface 7-3 of the outer sleeve 7 is brought into the clamping hole 6-2. Then, the installation groove 6-1 and the clamping hole 6-2 are opened by using a special tool until the excircle surface 5-4 of the rear seat 5 may enter the clamping hole 6-2, and the special tool is withdrawn. The clamping hole 6-2 restores the original shape in a case of being driven by the material recovery performance of the gravity-adapted block 6, and clamps the excircle surface 5-4 of the rear seat 5, such that the gravity-adapted block 6 and the rear seat 5 are firmly connected together.

During operation, the gravity-adapted optical fiber connector is vertically inserted into a collimation sleeve 1-1 of an adapter 1 in a direction of gravity G, and is physically butt jointed with another physical butt joint surface of the fiber stub in the collimation sleeve 1-1 at an optical reference surface P. The whole composed of the gravity-adapted block 6 and the rear seat 5 is guided by the second excircle surface 3-3 of the tail handle, and the elastic device 4 is pushed to be compressed along the direction of gravity, i.e. the gravity of the gravity-adapted block 6 is applied to the elastic device 4 through the end face 5-1 of the rear seat, after the elastic device 4 is compressed, an elastic force having the same magnitude and direction as those of the gravity is generated and is applied on the first end face 3-2 of the tail handle, and then, the elastic force is transmitted to the physical butt joint surface 2-2 of the fiber stub 2 through a fixed connection of the tail handle 3 and the fiber stub 2, such that the physical butt joint surface 2-2 of the fiber stub 2 always has a precise and balanced pre-tightening force.

Figure 4:
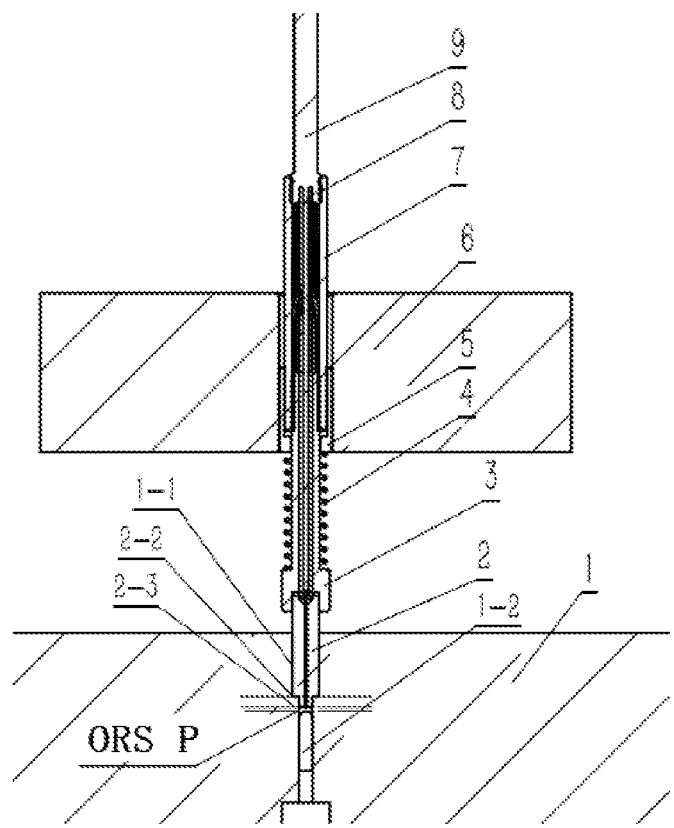
FIG. 4 is a schematic diagram showing a special example of the gravity adaptation optical fiber connector when a light-receiving device in an adapter is a lens according to the present disclosure.

As shown in FIG. 1, the physical butt joint involved in the gravity-adapted optical fiber connector refers to physical support of the physical butt joint surface 2-2 of the fiber stub 2 of the gravity-adapted optical fiber connector, and the optical reference surface P refers to an optical coupling surface between the gravity-adapted optical fiber connector and another optical receiving device in the collimation sleeve 1-1. Therefore, the position of the optical reference surface P and the physical butt joint are not necessarily coincident. As shown in FIG. 4, when the optical receiving device 1-2 in the adapter 1 involved in the gravity-adapted optical fiber connector of the present disclosure is a lens, the optical reference surface P and the physical butt joint surface of the fiber stub 2 are two different surfaces.

Figure 5:
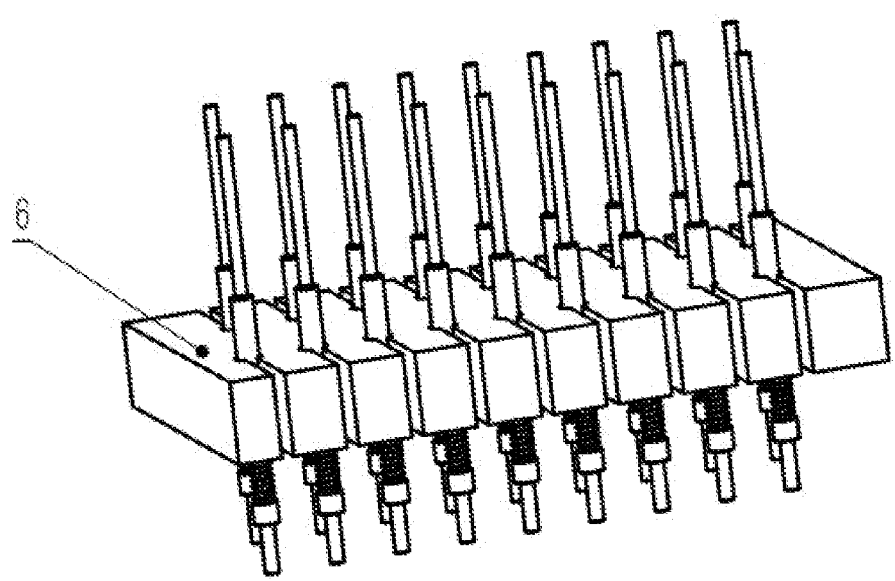
FIG. 5 is a schematic diagram showing an example of a plurality of connectors sharing a gravity-adapted block according to the present disclosure.

In practical applications, as shown in FIG. 5, a plurality of the gravity-adapted optical fiber connector may share one gravity-adapted block, which may be designed to meet that the magnitude of the gravity allocated to each gravity-adapted connector is uniform. A number of the gravity connector is set to be one or more, and the gravity connector shares one gravity-adapted block. The gravity-adapted block 6 includes an installation groove 6-1 and a clamping hole 6-2 whose numbers are matched with that of the gravity connector. The rear seat 5 of each gravity connector is provided in the corresponding clamping hole 6-2 of the gravity-adapted block, such that the gravity connector is fixedly connected with the gravity-adapted block. Each clamping hole 6-2 is provided at a gravity center position of the gravity-adapted block 6 where the corresponding gravity connector is located.

In an operating state, the connector is vertically and downwardly inserted in the adapter along the gravity direction, and the operating state is not limited to the case where the operating direction is only the direction of gravity, and it should also be understood as a structure whose operating direction is similar to the gravity direction and does not change with the change of space and time, for example, when operating in a vacuum gravity-free space, a predetermined force structure circumferentially and uniformly distributed about the optical axis can be provided. The gravity of the gravity-adapted block of the present disclosure is applied on the elastic device through the end face of the rear seat, and the elastic device is compressed and generates an elastic force having the same magnitude and direction as those of the gravity, the elastic force is applied to the first end face of the tail handle, and then, is transmitted to the fiber stub through the fixed connection between the tail handle and the fiber stub, such that the physical butt joint surface of the fiber stub always receives a pre-tightening force with a precise direction and unchanged magnitude, thereby, a stable optical fiber coupling efficiency and coupling performance are obtained.

Although the present invention has been shown and described in detail with reference to a related specific embodiment, it will be understood by those skilled in the art that various changes in form and details may be made therein without departing from the spirit and scope of the invention. All of these changes will fall within the scope of protection as claimed in the claims of the present disclosure.

What is claimed is:

1. A gravity-adapted optical fiber connector, characterized in comprising:
    a gravity-adapted block and at least one gravity connector, each gravity connector including a fiber stub, a tail handle, an elastic device, a rear seat, an outer sleeve and an optical cable;
    wherein an optical fiber in the optical cable is coupled to the fiber stub through the tail handle and the outer sleeve; an end of the tail handle is fixedly connected with the fiber stub, and the other end is connected with the outer sleeve; the elastic device is sleeved on a portion of excircle surface of the tail handle and is limited by an end face of the rear seat and an end face of the tail handle, the rear seat is clamped and fixed by the gravity-adapted block, gravity of the gravity-adapted block is applied to the elastic device through the end face of the rear seat, and after the elastic device is compressed, an elastic force having the same magnitude and direction as those of the gravity of the gravity-adapted block is generated and acted on the end face of the tail handle, such that a physical butt joint surface of the fiber stub is always applied with a pre-tightening force related to the gravity of the gravity-adapted block.

2. The gravity-adapted optical fiber connector of claim 1, characterized in that the gravity-adapted block includes an installation groove and a clamping hole, wherein a width of the installation groove is larger than an outer diameter of the optical cable, the clamping hole is connected with the installation groove, and an inner diameter of the clamping hole is not larger than a diameter of excircle surface of the rear seat with which it is matched.

3. The gravity-adapted optical fiber connector of claim 1, characterized in that a material of the gravity-adapted block is an elastic material.

4. The gravity-adapted optical fiber connector of claim 1, characterized in that an optical axis of the gravity-adapted connector when used and matched is extended along a gravity direction or a consistent direction equivalent to the gravity direction, wherein a gravity distribution of the fiber stub, the tail handle, the elastic device, the rear seat, the outer sleeve, the optical cable, and the gravity-adapted block are symmetrical along circumference of the optical axis.

5. The gravity-adapted optical fiber connector of claim 1, characterized in that the optical cable includes an optical fiber, an optical cable aramid, and an optical cable sheath sequentially arranged from inside to outside, the optical cable aramid is provided between the tail handle and the outer sleeve, and the optical cable aramid, the outer sleeve and the tail handle are connected into a whole; the optical cable sheath and the outer sleeve are connected into a whole through a flexible glue or a rivet connection or a threaded connection.

6. The gravity-adapted optical fiber connector of claim 1, characterized in that the tail handle is a step structure including a first excircle surface and a second excircle surface, the rear seat includes an end face of the rear seat, a first inner hole of the rear seat, a second inner hole of the rear seat, and an excircle surface of the rear seat; an aperture of the second inner hole of the rear seat is larger than an outer diameter of the outer sleeve, an aperture of the first inner hole of the rear seat is larger than a diameter of the second excircle surface of the tail handle; a size of the inner hole of the elastic device is larger than the diameter of the second excircle surface of the tail handle, and is smaller than a diameter of the first excircle surface of the tail handle and an outer diameter of the rear seat.

7. The gravity-adapted optical fiber connector of claim 1, characterized in that a material of the gravity-adapted block is an iron-nickel alloy 4J29.

8. The gravity-adapted optical fiber connector of claim 1, characterized in that a number of the gravity connector is set to be more than one, and a plurality of the gravity connectors share one gravity-adapted block, the gravity-adapted block includes an installation groove and a clamping hole whose numbers are matched with that of the gravity connector, the rear seat of each gravity connector is provided in the corresponding clamping hole of the gravity-adapted block, such that the gravity connector is fixedly connected with the gravity-adapted block, each clamping hole is provided at a gravity center position of the gravity-adapted block where the corresponding gravity connector is located.

\* \* \* \* \*